(12) United States Patent
Youn

(10) Patent No.: US 7,661,497 B2
(45) Date of Patent: Feb. 16, 2010

(54) UPPER SWING BODY WITH MINIMIZED REAR PROTRUSION IN EXCAVATOR

(75) Inventor: In Mook Youn, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 375 days.

(21) Appl. No.: 11/615,385

(22) Filed: Dec. 22, 2006

(65) Prior Publication Data
US 2007/0163826 A1 Jul. 19, 2007

(30) Foreign Application Priority Data
Dec. 27, 2005 (KR) .................. 10-2005-0130228

(51) Int. Cl.
*B62D 25/10* (2006.01)
(52) U.S. Cl. .............. 180/89.17; 180/89.18; 165/42
(58) Field of Classification Search ......... 180/89.17, 180/89.18, 68.1, 68.4, 69.2, 69.24, 89.14; 165/41, 42, 51, 149; 123/41.49, 198 E; 296/193.11, 296/190.01, 190.04, 190.05, 190.09, 190.1
See application file for complete search history.

(56) References Cited

U.S. PATENT DOCUMENTS 6,431,299 B1 * 8/2002 Asche et al. ............ 180/68.1
6,435,264 B1 * 8/2002 Konno et al. ............ 165/41
7,287,810 B2 * 10/2007 Ishii et al. ............ 296/190.05
2005/0211483 A1 * 9/2005 Pfohl et al. ............ 180/68.1

FOREIGN PATENT DOCUMENTS

DE 19839783 A1 * 9/1999
JP 6144022 A * 5/1994
WO WO 2005035341 A1 * 4/2005

\* cited by examiner

*Primary Examiner*—Paul N Dickson
*Assistant Examiner*—Drew Brown
(74) *Attorney, Agent, or Firm*—Lee, Hong, Degerman, Kang & Waimey

(57) ABSTRACT

An upper swing body of an excavator is disclosed wherein a rear protrusion is minimized to reduce an operating radius and a cooling performance is improved even in a narrow engine room. An upper swing body of an excavator according to the present invention comprises a main frame (12) forming a base of the upper swing body; a support (16) including a pair of vertical frames (17, 18) disposed upwardly from an upper surface of a rear portion of the main frame (12) and laterally spaced apart from each other by a certain distance, and a horizontal frame (19) for connecting upper ends of the pair of vertical frames (17, 18) to each other; a cab (80) having a front lower portion supported by the main frame (12), and a rear lower portion supported by the support (16); and an engine (10) disposed in a space formed below the horizontal frame (19) of the support (16).

7 Claims, 5 Drawing Sheets

UPPER SWING BODY WITH MINIMIZED REAR PROTRUSION IN EXCAVATOR

CROSS-REFERENCE TO RELATED APPLICATION

This application claims the benefit of Korean Patent Application No. 10-2005-0130228 filed on Dec. 27, 2005, in the Korean Intellectual Property Office, the disclosure of which is incorporated herein by reference.

BACKGROUND OF THE INVENTION

1. Field of the Invention

The present invention relates to an upper swing body of an excavator, and more particularly, to an upper swing body of an excavator, wherein a rear protrusion is minimized to reduce an operating radius and a cooling performance is improved even in a narrow engine room.

2. Description of the Related Art

An excavator is construction equipment used for excavating earth/sand or aggregate, loading earth/sand or aggregate on a vehicle, or compacting the ground. As shown in FIG. 1, a conventional type excavator comprises a lower traveling body (100) provided with a traveling apparatus, and an upper swing body (110) rotatably mounted on the lower traveling body (100) and provided with a cab (111) and an operating apparatus. In addition, since an engine serving as a power source is provided in the upper swing body (110), an engine room is required as a space for arrangement of the engine. An outer shell of the engine room is defined by an engine room cover (113). Furthermore, a counterweight for maintaining weight balance for the operating apparatus should be provided in the upper swing body (110).

As described above, a number of components should be disposed in the upper swing body (110). Requirements for arrangement of these components are as follows.

First, in order to smoothly perform the tasks of excavating earth/sand or aggregate, loading earth/sand or aggregate on a vehicle, or compacting the ground, the operating apparatus should be located at a foremost portion of the upper swing body (110). Further, it is preferred that the cab (111) in which an operator sits and manipulates the operating apparatus be disposed at a front side of the upper swing body (110) to secure a front visual field of the operator. Accordingly, the engine room is inevitably disposed at a side or rear of the cab (111) in the upper swing body (110). Considering the balance of a weight distribution, the occurrence of operation noise/vibration and easy access for maintenance, however, it is desirable to arrange the engine room at the rear of the cab (111). Even in the excavator shown in FIG. 1, the engine room is arranged at the rear of the cab (111), i.e., a rearmost portion of the upper swing body (110). Meanwhile, not only an engine and various parts for running the engine but also a radiator for use in cooling the engine and an oil cooler for cooling a working oil are arranged in the engine room. Accordingly, the engine room should have a space with a certain volume, and thus, the engine room is formed to protrude toward the rear of the upper swing body (110). That is, the engine room becomes a rear protrusion of the upper swing body (110). Since the protrusion exists at a rear portion of the upper swing body (110), a swing radius of the upper swing body (110) is increased. Accordingly, a larger operating area is required for such an excavator having a protrusion formed at a rear portion of an upper swing body. So far as the size of the engine is not reduced, there is limitation on simple reduction in the volume of the engine room to minimize the rear protrusion of the upper swing body. Further, since the reduction in the volume of the engine room makes the arrangement of the radiator or oil cooler very difficult, there is a problem in that cooling performance for the engine or the working oil may be lowered.

SUMMARY OF THE INVENTION

The present invention is conceived to solve the aforementioned problems. An object of the present invention is to provide an upper swing body with a minimized rear protrusion in an excavator.

According to the present invention for achieving the object, there is provided an upper swing body of an excavator, comprising a main frame forming a base of the upper swing body; a support including a pair of vertical frames disposed upwardly from an upper surface of a rear portion of the main frame and laterally spaced apart from each other by a certain distance, and a horizontal frame for connecting upper ends of the pair of vertical frames to each other; a cab having a front lower portion supported by the main frame, and a rear lower portion supported by the support; and an engine disposed in a space formed below the horizontal frame of the support.

The upper swing body of the present invention may further comprise a radiator having a lateral side end fixed to either of the pair of vertical frames to cool the engine; and a vortex prevention plate fixed to an upper end of the radiator and extending horizontally.

The upper swing body of the present invention may further comprise a fixing bracket fixed to an upper end of either of the pair of vertical frames and extending horizontally, wherein the upper end of the radiator is fixed to the fixing bracket and the vortex prevention plate is fixed to the fixing bracket.

The upper swing body of the present invention may further comprise a sound absorbing plate made of a sound absorbing material and attached to a lower surface of the vortex prevention plate.

The upper swing body of the present invention may further comprise an engine room cover installed on the main frame to define an outer shell of an engine room for accommodating the support and the engine.

In the upper swing body of the present invention, the engine room cover may include a first cover pivotable to open and close a rear portion of the engine room, and a second cover pivotable to open and close a lateral side portion of the engine room, the first cover may be hingedly supported by a hinge portion provided at the horizontal frame, and the second cover may be selectively locked by a locking member provided at either of the pair of vertical frames.

In the upper swing body of the present invention, the engine may have an air cleaner fixed to the support.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, an upper swing body of an excavator according to a preferred embodiment of the present invention will be described in detail with reference to the accompanying drawings.

Figure 1:
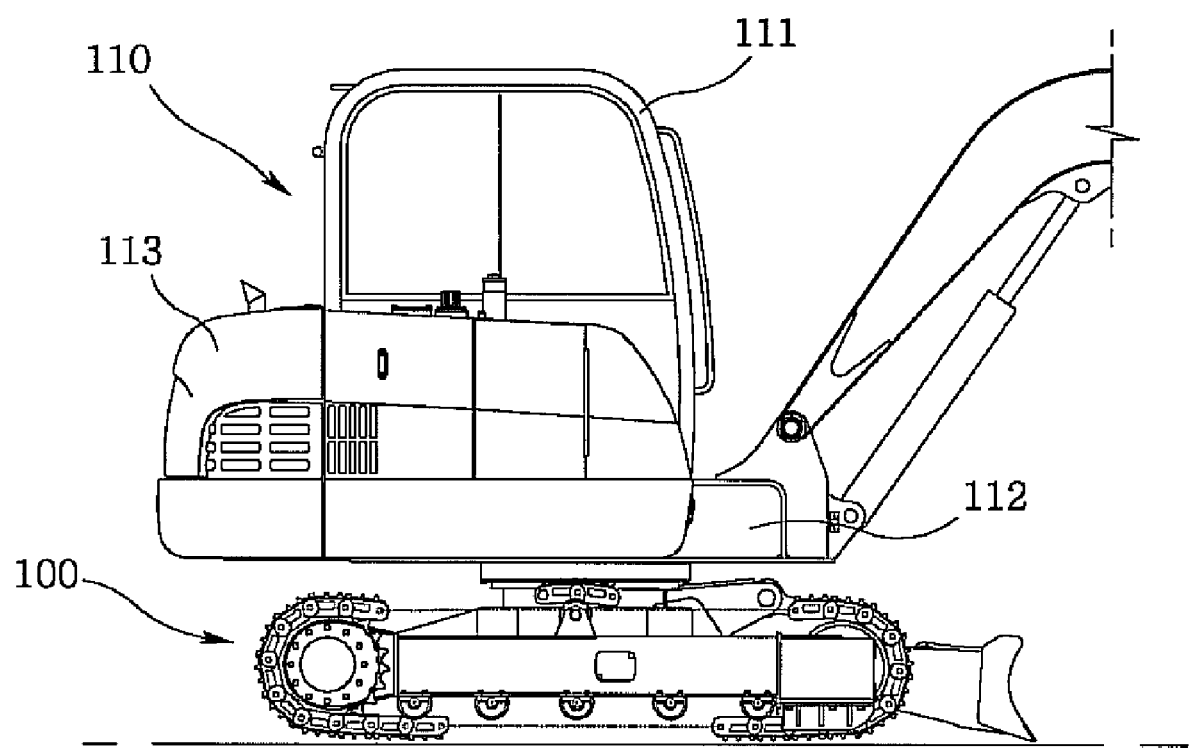
FIG. 1 is a side view showing an example of a conventional excavator.
Figure 2:
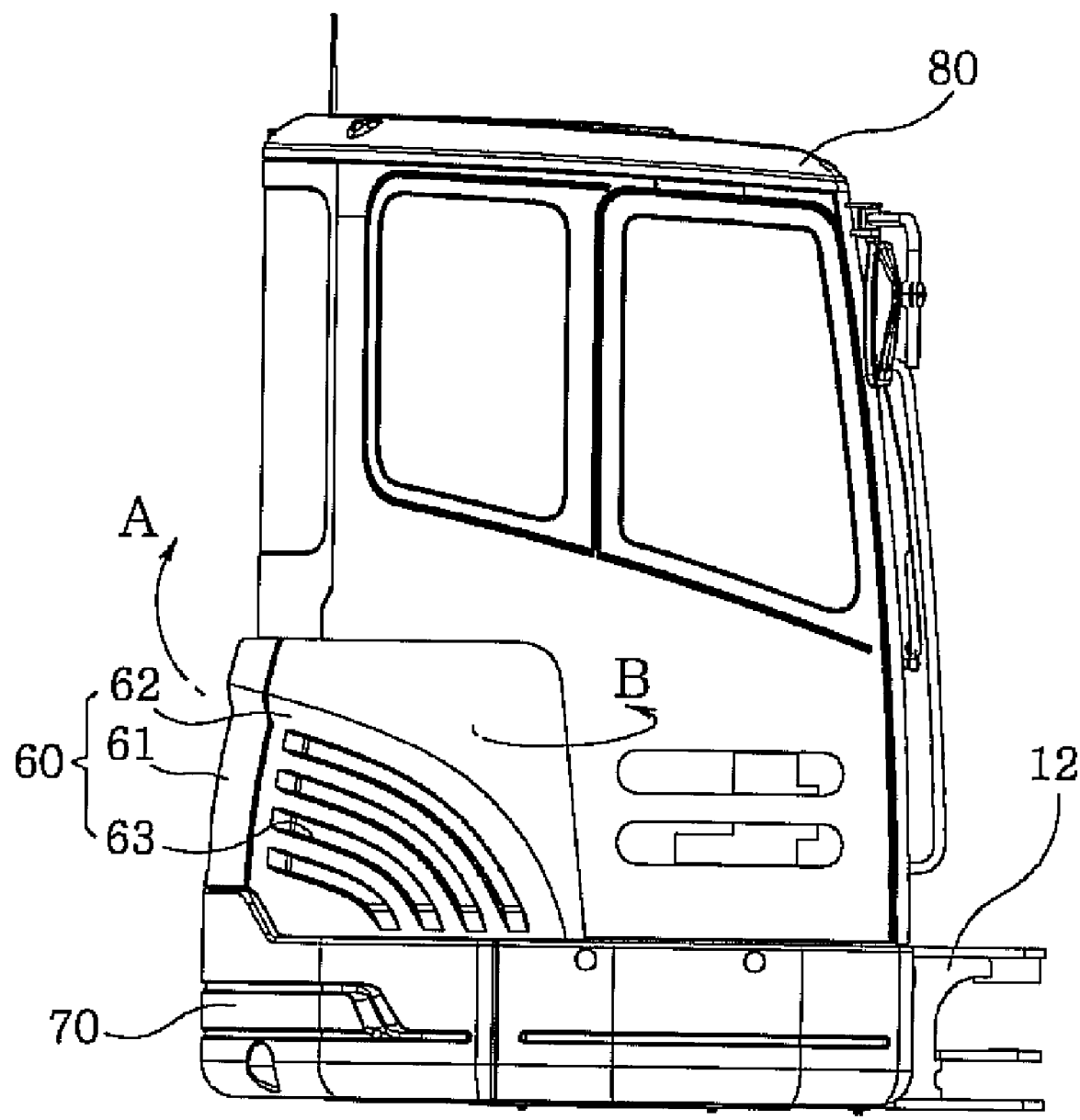
FIG. 2 is a right side view of an upper swing body of an excavator according to an embodiment of the present invention.

FIG. 2 is a side view of an upper swing body of an excavator according to an embodiment of the present invention.

A main frame (12) forms a base of the upper swing body and supports other components such as a cab (80), an engine room, a counterweight (70) and the like.

The cab (80) is a box-shaped structure formed with an inner space, so that an operator can get in the cab and operate the excavator. The cab (80) has a front lower portion that is in direct contact with and supported by the main frame (12), and a rear lower portion that is not in direct contact with but spaced apart from the main frame (12). That is, a certain space is defined between the rear lower portion of the cab (80) and the main frame (12).

An engine room is arranged in the space between the rear lower portion of the cab (80) and the main frame (12). The engine room is a space for accommodating an engine (10 in FIG. 4), and an outer shell of the engine room is defined by an engine room cover (60). The engine room cover (60) comprises a formed plate member and has vents (63) formed therethrough to ensure a flow of air.

Although the space serving as the engine room is defined between the rear lower portion of the cab (80) and the main frame (12), the engine room cover (60) or the engine cannot support the weight of the cab (80). Thus, a support (16) is provided for supporting the weight of the cab.

Figure 3:
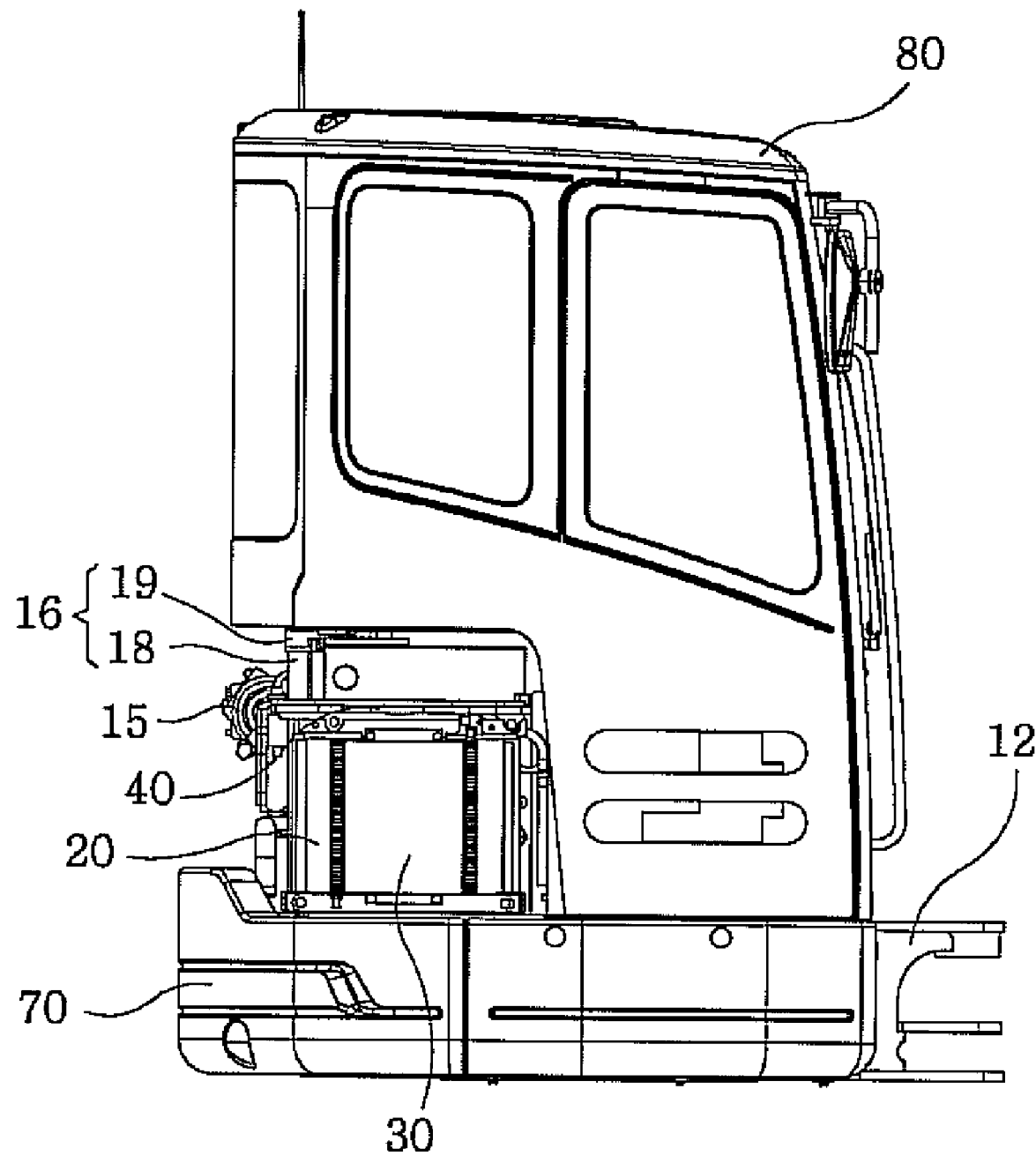
FIG. 3 is a right side view of the upper swing body shown in FIG. 2, in a state where an engine room cover is removed.
Figure 4:
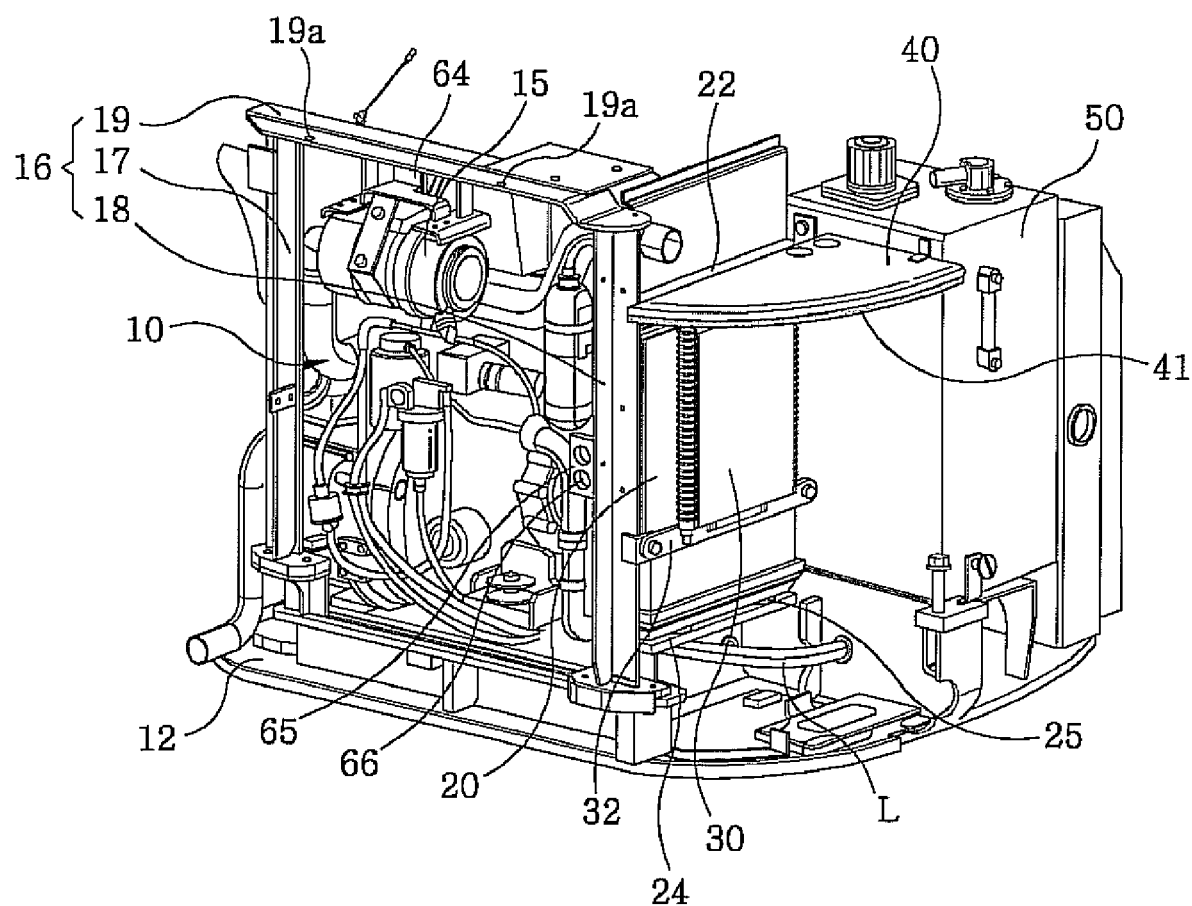
FIG. 4 is a perspective view of the interior of an engine room in the embodiment shown in FIG. 2, when viewed from a lateral side at the rear of the engine room.
Figure 5:
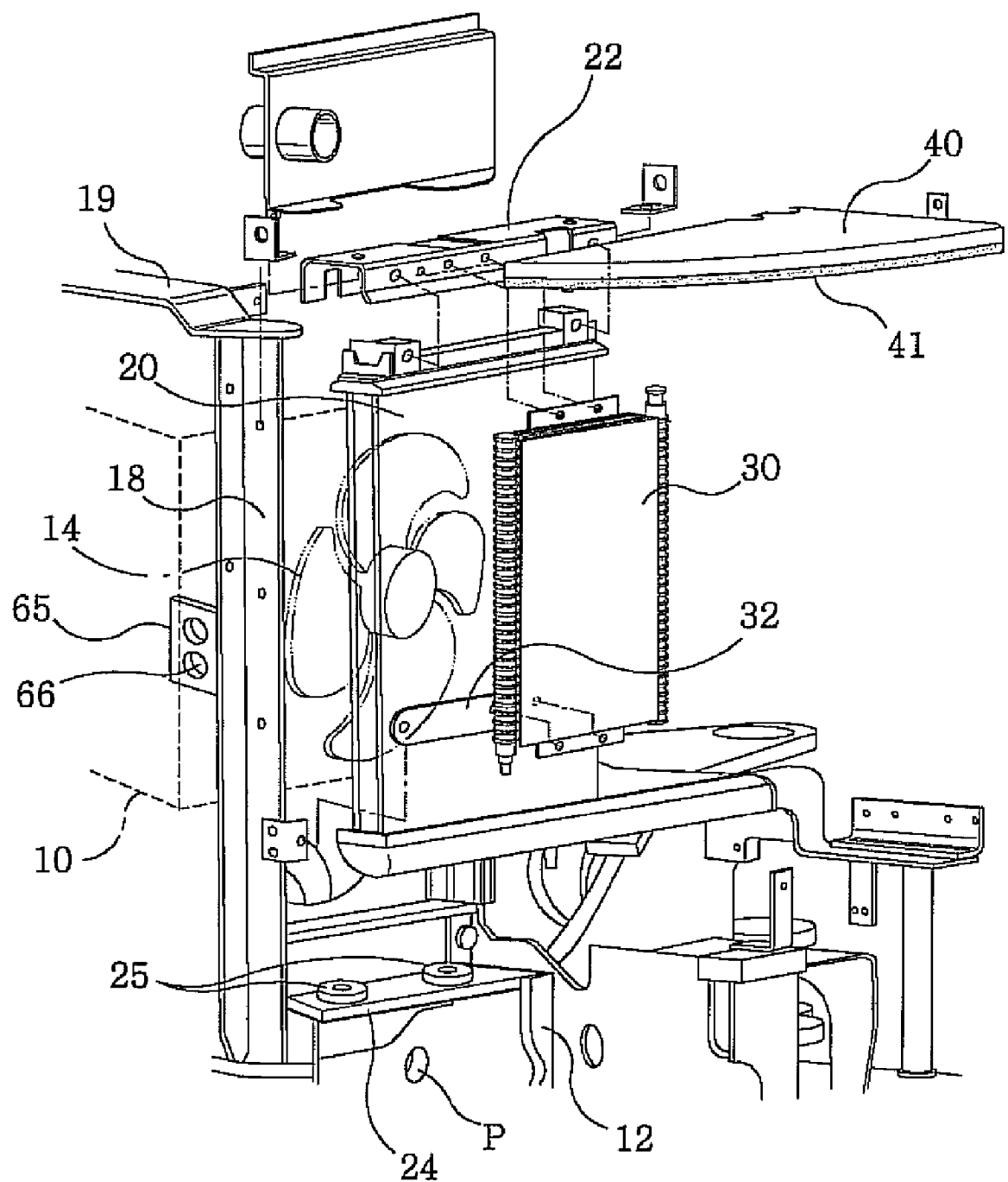
FIG. 5 is a partial exploded perspective view of FIG. 4.

FIG. 3 is a side view showing a state where the engine room cover (60) is removed in the embodiment of FIG. 2, and FIG. 4 is a perspective view of the interior of the engine room, when viewed from a lateral side at the rear of the engine room. The configuration of the interior of the engine room will be described below with reference to these figures. The support (16) comprises a pair of vertical frames (17, 18) and a horizontal frame (19). The pair of vertical frames (17, 18) are disposed upwardly from an upper surface of a rear portion of the main frame (12) and spaced apart from each other by a certain distance. The horizontal frame (19) is horizontally disposed while connecting upper ends of the pair of vertical frames (17, 18) to each other. All the pair of vertical frames (17, 18) and the horizontal frame (19) are in the form of beams or square bars.

The rear lower portion of the cab (80) is supported by the support (16). That is, the cab (80) is in direct contact with the horizontal frame (19) of the support (16) and is supported indirectly by the pair of vertical frames (17, 18). Ultimately, the weight of the rear portion of the cab (80) is transmitted to the main frame (12). In this embodiment to be described below in greater detail, the rear lower portion of the cab (80) is secured on the horizontal frame (19) by means of bolts (not shown) fastened to fastening holes (19a) of the horizontal frame (19), as shown in FIG. 4. In some cases, the cab (80) may be arranged such that the rear lower portion thereof is in direct contact with the upper ends of the pair of vertical frames (17, 18 ).

In any cases, an empty space is formed below the horizontal frame (19), and the engine (10) is disposed in this empty space. Since the engine room is defined between the rear lower portion of the cab (80) and the main frame (12) as such, a rear protrusion of the upper swing body can be minimized as a whole. In addition, a radiator (20) for use in cooling the engine (10) and an oil cooler (30) for cooling a working oil are installed on and supported by the support (16). Furthermore, accessories of the engine (10), such as an air cleaner (15), can be installed on the support (16).

Referring again to FIGS. 2 to 4, the upper swing body of an excavator according to the embodiment of the present invention comprises the main frame (12) on which the engine (10) is mounted; a cooling fan (14) provided at a right side of the engine (10); the support (16) provided on the main frame (12); the radiator (20) provided on the support (16) to face the cooling fan (14); the oil cooler (30) provided on the support (16) to face the radiator (20); and a vortex prevention plate (40) provided above the radiator (20) and the oil cooler (30).

The main frame (12) is to constitute the skeleton of the excavator and supports the various components described above. The counterweight (70) is supported by a rear portion of the main frame (12), and the operating apparatus (not shown) is installed at a front portion of the main frame.

The cooling fan (14) is provided at the right side of the engine (10) and is simultaneously rotated when the engine (10) is run. Once the cooling fan (14) is rotated, external air is introduced through the vents (63) provided in the engine room cover (60) and the introduced air sequentially passes through the oil cooler (30), the radiator (20) and the engine (10) and is then discharged to the outside.

The support (16) comprises the left and right vertical frames (17, 18) provided at the rear portion of the main frame (12) such that the vertical frames (17, 18) are laterally spaced apart by a certain distance from each other, and the horizontal frame (19) connecting the upper ends of the left and right vertical frames (17, 18). As described above, since front and rear faces as well as both side faces of the support (16) are open, it is not necessary to detach the support (16) upon demounting of parts associated with the engine, the radiator (20) and the oil cooler (30) That is, since the support (16) has only the frames (17, 18, 19) each of which is in the form of a beam or square bar, it is easy to replace the radiator (20) and the oil cooler (30) with new ones.

The radiator (20) is installed on the main frame (12) to face the cooling fan (14). More specifically, an upper end of the radiator (20) is fixed to a first fixing bracket (22), which is installed on the right vertical frame 18, by means of bolts, and a lower end of the radiator (20) is simply placed on and supported by a mounting plate (24), which is provided on the main frame (12), without coupling using a bolt. A mounting rubber (25) is provided on the mounting plate (24) and prevents from transmitting vibration of the main frame (12) to the radiator. Since the lower end of the radiator (20) is installed to be simply supported on the mounting plate (24) without coupling using a bolt in such a manner, the radiator (20) can be demounted by removing only the bolts fastened to the upper end of the radiator (20) and lifting the radiator (20) upwardly. Here, the first fixing bracket (22) refers to a rod-shaped member which has one end fixed to the right vertical frame (18) and extends horizontally. The first fixing bracket (22) is used for stably installing the radiator (20). Alternatively, the radiator (20) may be fixed directly to the right vertical frame (18). Meanwhile, the mounting plate (24) is installed to be spaced apart by a certain distance from the main frame (20). A passage (P) through which various wires and hydraulic lines connected to the engine (10) pass is formed between a lower portion of the mounting plate (24) and the main frame (12). In the prior art, since the radiator (20) is fixed directly to an upper surface of the main frame (12), the various wires and hydraulic lines (L) are routed on another bypass path. However, if an inner space of a vehicle is narrow, it is difficult to provide such a bypass path at a different region as in the prior art. Thus, it is preferred that a passage (P) through which various wires and hydraulic lines (L) can pass be provided even in a narrow space by installing the radiator (20) to be spaced apart by a certain distance from the main frame (12).

The oil cooler (30) is placed to face the radiator (20) and has an upper end installed on the first fixing bracket (22) and a lower end installed on a second fixing bracket (32). The second fixing bracket (32) has on end coupled to the right vertical frame (18) and the other end installed on an oil tank (50). The oil tank (50) is provided for storing the working oil and is a requisite structure for a hydraulically driven vehicle such as an excavator. The second fixing bracket (32) is also a rod-shaped member which has one end fixed to the right vertical frame (18) and extends horizontally. The second fixing bracket (32) is also an auxiliary member for stable installation of the oil cooler (30). Alternatively, the oil cooler (30) may be fixed directly to the right vertical frame (18).

The vortex prevention plate (40) has one end fixed to the first fixing bracket (22) so as to cover the radiator (20) and the oil cooler (30) thereabove and the other end extending horizontally to the right side. A front end of the vortex prevention plate (40) is fixed to the oil tank (50). The vortex prevention plate (40) prevents the introduced external air from flowing into any space above the radiator (20) and the oil cooler (30) and generating a vortex, and guides the external air to the radiator (20) and the oil cooler (30), resulting in improved cooling efficiency. It is preferred that a sound absorbing plate (41) made of a sound absorbing material such as sponge be attached to a lower surface of the vortex prevention plate (40). The sound absorbing plate (41) reduces noise which may be generated due to air flowing along the lower surface of the vortex prevention plate (40). Meanwhile, a lateral side and a rear face of the main frame (12) can be opened and closed by the engine room cover (60) that is made by press-forming a metal sheet. Although the engine room cover (60) defines the outer shell of the engine room while covering the oil cooler (30) as well as the support (16), the engine (10) and the radiator (20), it does not function to support the cab (80). The engine room cover (60) comprises a first cover (61) for opening and closing a rear portion of the vehicle, and a second cover (62) for opening and closing a side portion of the vehicle facing the radiator (20). The second cover (62) is formed with the vents (63) that are passages through which external air is introduced upon driving the cooling fan. The first cover (61) is hingedly connected to a first hinge portion (64) formed on a lower surface of the horizontal frame (19) and can be selectively locked by means of a first locking member (not shown) additionally provided at the rear portion of the main frame (12). The second cover (62) is hingedly connected to a second hinge portion (not shown) formed in vicinity of the oil tank (50) and can be selectively locked by means of a second locking member (65) provided at the right vertical frame (18). The second locking member (65) may comprise an elastically supported protrusion or the like for selectively locking the second cover (62). In this embodiment, the second locking member (65) comprises a pair of fixing bolts (not shown) fastened to fastening holes (66) provided in the second locking member (65). Accordingly, the support (16) can perform the functions of supporting the cab (80) and the first cover (61) and fixing the second cover (62).

The radiator (20) and the oil cooler (30) can be demounted from the excavator constructed as above in the following order. First, the first cover (61) is pivoted in a first direction (designated by an arrow (A) in FIG. 2) to open the rear portion of the engine room. Then, the locking of the second cover (62) is released by manipulating the second locking member (65), and the second cover is pivoted in a second direction (designated by an arrow (B) shown in FIG. 2) to expose the radiator and the oil cooler. When the oil cooler (30) is exposed, the vortex prevention plate (40) is demounted. Then, the second fixing bracket (32) of the oil cooler (30) is demounted and an upper end of the radiator (20) is separated from the first fixing bracket (22). Thereafter, the radiator (20) and the oil cooler (30) are lifted upwardly to be demounted. As described above, the radiator (20) and the oil cooler (30) can be demounted without demounting the support (16), the counterweight (70) or the cab (80), thereby improving serviceability of the cooling apparatuses of the excavator. Furthermore, since the lower end of the radiator (20) is supported while being merely placed on the mounting plate (24), the radiator (20) and the oil cooler (30) can be easily demounted.

In addition, the external air introduced through the vents (63) of the engine room cover (60) can pass by the oil cooler (30) and the radiator (20) without generation of a vortex by means of the vortex prevention plate (40), resulting in improved cooling efficiency.

According to the present invention described above, a space between the rear lower portion of the cab and the main frame can be secured by the support, and this space can be utilized as the engine room, thereby minimizing the a rear protrusion of the upper swing body.

Further, the support is configured not to cover the radiator and the oil cooler so that the radiator and the oil cooler can be easily replaced with new ones. In particular, since the lower end of the radiator is supported by the mounting plate without coupling using a bolt, the replacement of the radiator and the oil cooler can be more facilitated. Since the radiator and the oil cooler can be easily replaced as above, the serviceability of the excavator is improved.

In addition, the vortex prevention plate is installed to cover the radiator and the oil cooler thereabove so that a vortex can be prevented from being generated in an introduced stream of air. The prevention of the vortex improves cooling efficiency.

Although the present invention has been described in connection with the preferred embodiment of the present invention in order to exemplify the principle of the present invention, the present invention is not limited to the same constitution and operation as illustrated and described above. That is, it will be understood by those skilled in the art that various changes and modifications can be made thereto without departing from the spirit and scope of the present invention defined by the appended claims. Accordingly, such appropriate modifications, changes and equivalents thereof should be considered to fall within the scope of the present invention.

What is claimed is:

1. An upper swing body of an excavator, the upper swing body comprising:
 a main frame forming a base of the upper swing body;
 a support comprising a pair of vertical frames disposed upwardly from an upper surface of a rear portion of the main frame, wherein the pair of vertical frames are laterally spaced apart from each other by a certain distance, the support further comprising a horizontal frame for connecting upper ends of the pair of vertical frames to each other;
 a cab having a front lower portion supported by the main frame and a rear lower portion supported by the support;
 an engine disposed in a space formed below the horizontal frame; and an engine room cover installed on the main frame to define an outer shell of an engine room and configured to accommodate the support and the engine, wherein the engine room cover comprises a first pivotable cover to open and close a rear portion of the engine room, and a second pivotable cover to open and close a lateral side portion of the engine room, wherein the first pivotable cover is hingedly supported by a hinge portion provided at the horizontal frame, and the second pivotable cover is selectively locked by a locking member provided at either of the pair of vertical frames.

2. The upper swing body of claim 1, further comprising:
a radiator for cooling the engine, the radiator comprising a lateral side end fixed to either of the pair of vertical frames; and
a vortex prevention plate fixed to an upper end of the radiator, wherein the vortex prevention plate extends horizontally.

3. The upper swing body of claim 2, further comprising:
a fixing bracket fixed to an upper end of either of the pair of vertical frames, wherein the fixing bracket extends horizontally,
wherein the upper end of the radiator and the vortex prevention plate are fixed to the fixing bracket.

4. The upper swing body of claim 3, wherein the engine has an air cleaner fixed to the support.

5. The upper swing body of claim 2, further comprising:
a sound absorbing plate comprising a sound absorbing material, wherein the sound absorbing plate is attached to a lower surface of the vortex prevention plate.

6. The upper swing body of claim 2, wherein the engine comprises an air cleaner fixed to the support.

7. The upper swing body of claim 1, wherein the engine comprises an air cleaner fixed to the support.

* * * * *